(12) United States Patent
Hare (10) Patent No.: US 12,491,597 B1
(45) Date of Patent: Dec. 9, 2025

(54) MACHINING STOPS (71) Applicant: Jeffrey D. Hare, Menomonee Falls, WI (US)

(72) Inventor: Jeffrey D. Hare, Menomonee Falls, WI (US)

(*) Notice: Subject to any disclaimer, the term of this patent is extended or adjusted under 35 U.S.C. 154(b) by 346 days.

(21) Appl. No.: 18/369,431

(22) Filed: Sep. 18, 2023

(51) Int. Cl.
*B23Q 16/00* (2006.01)
(52) U.S. Cl.
CPC .................. *B23Q 16/001* (2013.01)
(58) Field of Classification Search
CPC ............... B23Q 16/001; B25B 1/103
See application file for complete search history.

(56) References Cited

U.S. PATENT DOCUMENTS

| | | | | |
|---|---|---|---|---|
| 1,033,758 A * | 7/1912 | Howell | .................... | B25B 5/106 411/84 |
| 2,317,702 A * | 4/1943 | Wallace | .................... | B25B 1/08 269/285 |
| 2,625,861 A * | 1/1953 | Swanson | .................. | B23Q 3/06 269/157 |
| 4,020,742 A * | 5/1977 | Raymond | ............ | B23Q 16/001 409/218 |
| 5,002,265 A * | 3/1991 | Burt | ......................... | B25B 5/107 269/93 |
| 5,060,920 A * | 10/1991 | Engibarov | .............. | B25B 1/241 269/282 |
| 6,158,728 A * | 12/2000 | Smith | ..................... | B25B 5/006 269/93 |
| 10,179,392 B2 * | 1/2019 | Taylor | ................... | B25B 1/2478 |
| 2011/0084435 A1 | 4/2011 | Furlow | | |
| 2012/0205852 A1 * | 8/2012 | Coleman | ............... | B25B 1/2478 269/278 |
| 2013/0270760 A1 * | 10/2013 | Gordon | .................... | B23Q 3/18 269/315 |
| 2018/0104787 A1 * | 4/2018 | Richardson | .......... | B23Q 16/001 |

* cited by examiner

*Primary Examiner* — Seahee Hong
(74) *Attorney, Agent, or Firm* — Donald J. Ersler (57) ABSTRACT

A machining stop preferably includes a retention member, a base post, an adjustable stop retainer and a tool stop. The retention member preferably includes a stationary retention portion and an adjustable retention portion. An end of the stationary base member is engaged with an end of the adjustable base member. The base post is attached to the stationary retention portion. The adjustable stop retainer includes a post bore and a tool stop notch. The post bore is sized to slidably receive an outer perimeter of the base post. The tool stop notch is sized to receive the tool stop. A height fastener is threaded through a wall of the adjustable stop retainer. A tool stop fastener is threaded through a wall of the adjustable stop retainer. A plate machining stop preferably includes a plate retention member, the base post, the adjustable stop retainer and the tool stop.

19 Claims, 12 Drawing Sheets

MACHINING STOPS

BACKGROUND OF THE INVENTION

1. Field of the Invention

The present invention relates generally to machining piece parts and more specifically to machining stops, which are used to set-up milling machines for machining the piece parts.

2. Discussion of the Prior Art

Patent publication no. 2011/0084435 to Furlow discloses an adjustable flip stop assembly for positioning a work piece. Patent publication no. 2013/0270760 to Gordon discloses a cantilevered stop pin vise stop. It appears that the prior art does not disclose a machining stop, which may be positively retained in two adjacent keyways and includes a stop with vertical and horizontal adjustability.

Accordingly, there is a clearly felt need in the art for a machining stop, which may be positively retained in two adjacent keyways and includes a stop with vertical and horizontal adjustability.

SUMMARY OF THE INVENTION

The present invention provides a machining stop, which may be used to set-up milling machines for machining piece parts. The machining stop preferably includes a retention member, a base post, an adjustable stop retainer and a tool stop. The retention member preferably includes a stationary retention portion and an adjustable retention portion. The stationary retention portion includes a stationary base member and a stationary retention member. The stationary retention member extends downward from a bottom of the stationary base member. A stationary angled leg extends inward from a bottom of the stationary retention member. A post counterbore slot is formed through a top of the stationary base member to receive a hex nut and a threaded stud of the base post. The adjustable retention portion includes an adjustable base member and an adjustable retention member. The adjustable retention member extends downward from a bottom of the adjustable base member. An adjustable angled leg extends inward from a bottom of the adjustable retention member. An end of the stationary base member is preferably engaged with an end of the adjustable base member with a tightening fastener and at least one dowel.

The base post preferably includes a flat surface formed along a length thereof, the threaded stud and the hex nut. The threaded stud is threaded into a bottom of the base post. The threaded stud is inserted through a top of the counterbore slot. The hex nut is inserted into a bottom of the counterbore slot and the base post is rotated to threadably engage the threaded stud with the hex nut. The adjustable stop retainer includes a post bore, a tool stop notch and at least two fasteners. The post bore is sized to slidably receive an outer perimeter of the base post. The tool stop notch is formed in a top of the adjustable stop retainer. A height threaded tap is formed through a wall of the adjustable stop retainer, adjacent a bottom thereof. At least one tool stop threaded tap is formed through a wall of the adjustable stop retainer, adjacent a top thereof. The tool stop preferably includes at least one fastener groove formed in at least one side thereof. It is preferable that each end of the tool stop be angled to form line contact with a cutting tool. However, the ends of the tool stop may have any suitable shape.

The machining stop is preferably used in the following manner. The stationary retention portion and the adjustable retention portion are spread apart, such that the stationary retention member and the adjustable retention member may be inserted into two adjacent keyways of a milling machine. The tightening fastener is tightened, such that the angled legs of the stationary and adjustable retention members engage a bottom of the two adjacent keyways. The base post is tightened to the stationary retention portion such that the flat surface is perpendicular to an axis of the retention member. The base post is inserted into the post bore of the adjustable stop retainer. The height of the adjustable stop retainer is set by tightening a height fastener against the flat surface. The tool stop is placed in the tool stop notch. At least one top fastener is tightened to secure tool stop in the tool stop notch.

A plate machining stop preferably includes a plate retention member, the base post, the adjustable stop retainer and the tool stop. The plate retention member preferably includes a counterbore slot and two fastener counterbores formed on opposing ends. The counterbore slot is formed between the two fastener counterbores. The plate machining stop is attached to a top of Stevens type mounting plate by inserting two tightening plate fasteners through the two fastener counterbores and tightening the two tightening fasteners. The Stevens type mounting plate is attached to a top of a milling machine platen or the like. The base post is attached to the plate retention member in the same way as in the machining stop.

Accordingly, it is an object of the present invention to provide a machining stop, which may be positively retained in two adjacent keyways and includes a stop with vertical and horizontal adjustability.

Finally, it is another object of the present invention to provide a plate machining stop, which may be positively retained by a Stevens type mounting plate and includes a stop with vertical and horizontal adjustability.

These and additional objects, advantages, features and benefits of the present invention will become apparent from the following specification.

DETAILED DESCRIPTION OF THE PREFERRED EMBODIMENTS

Figure 1:
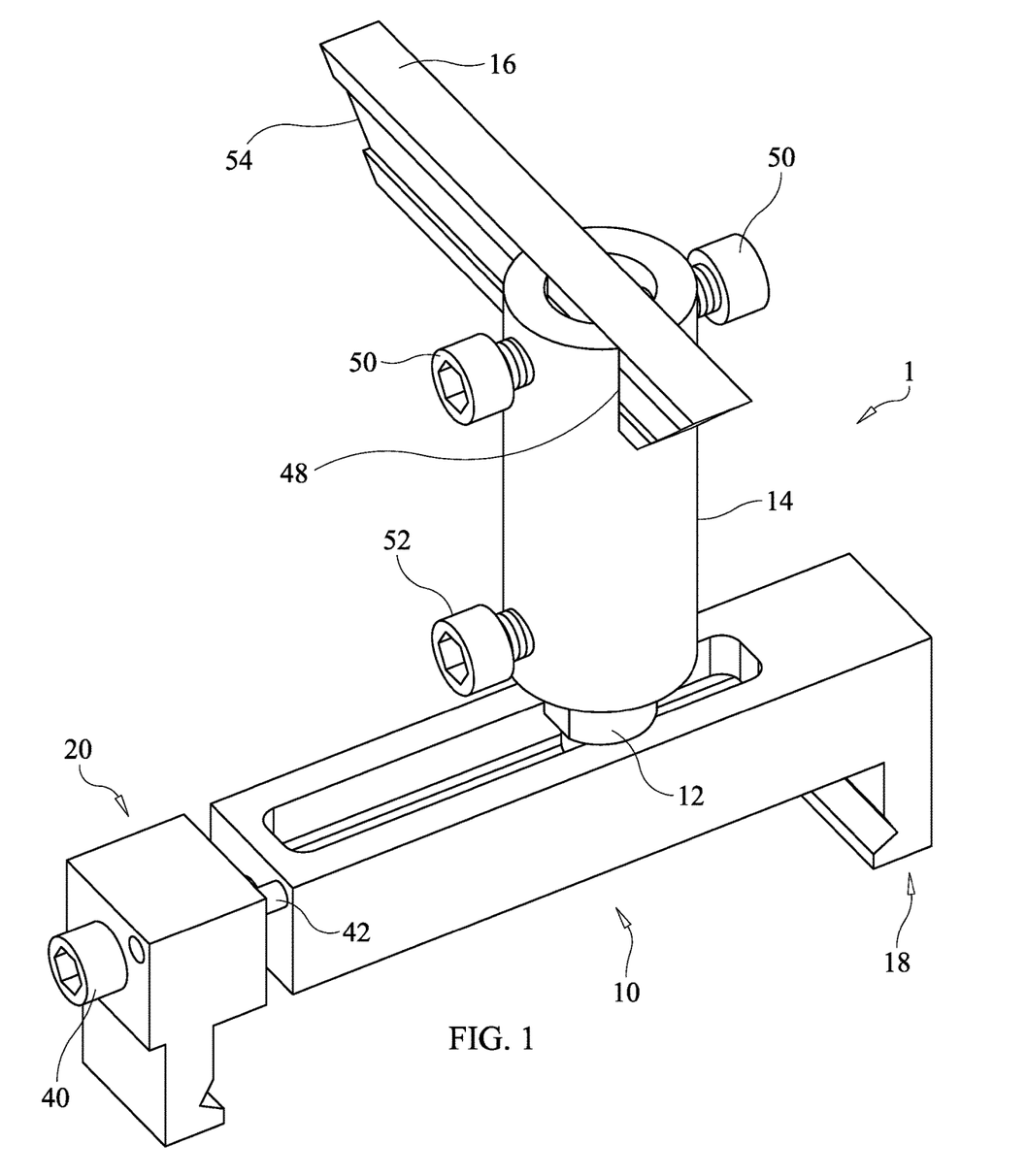
FIG. 1 is a perspective view of a machining stop in accordance with the present invention.
Figure 2:
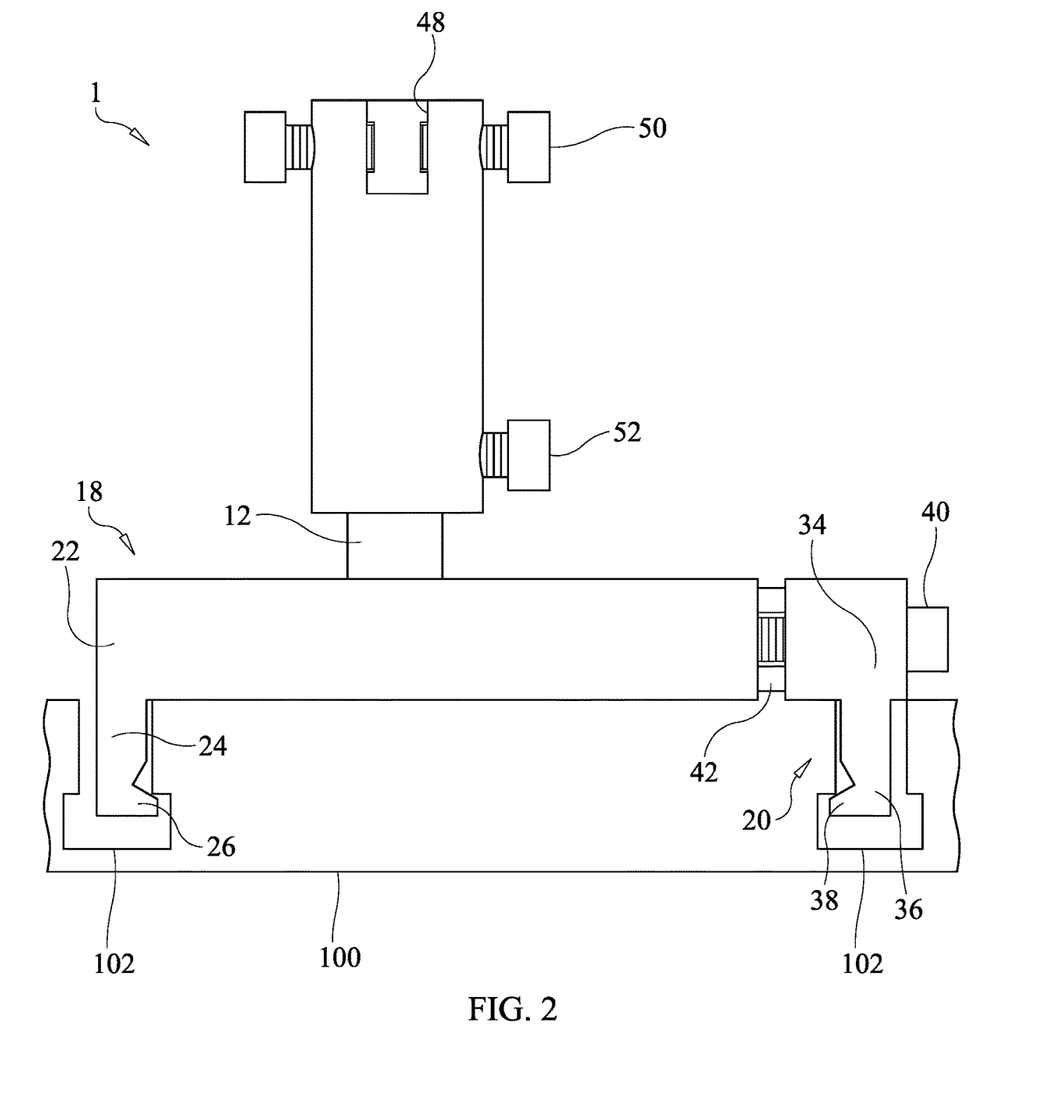
FIG. 2 is an end view of a machining stop in accordance with the present invention.
Figure 3:
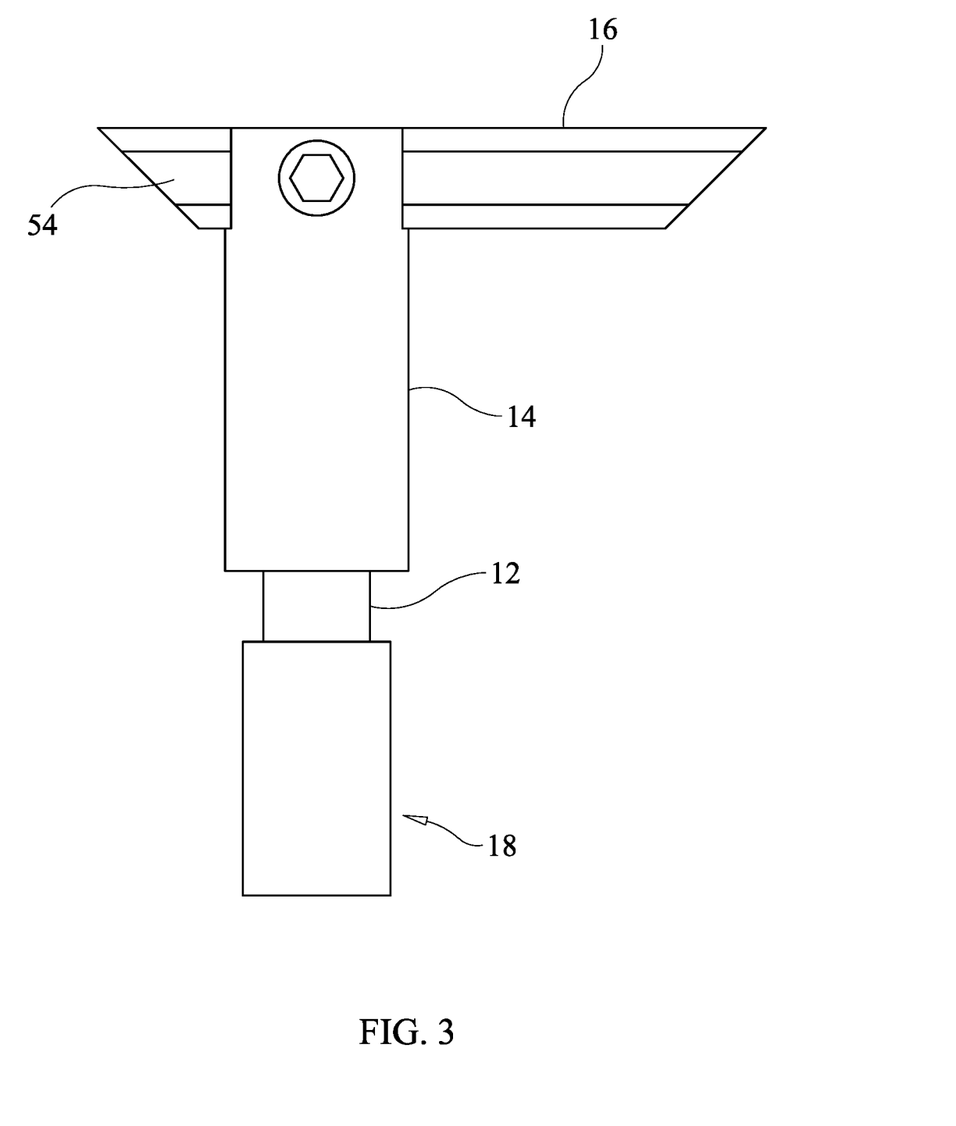
FIG. 3 is a side view of a machining stop in accordance with the present invention.
Figure 4:
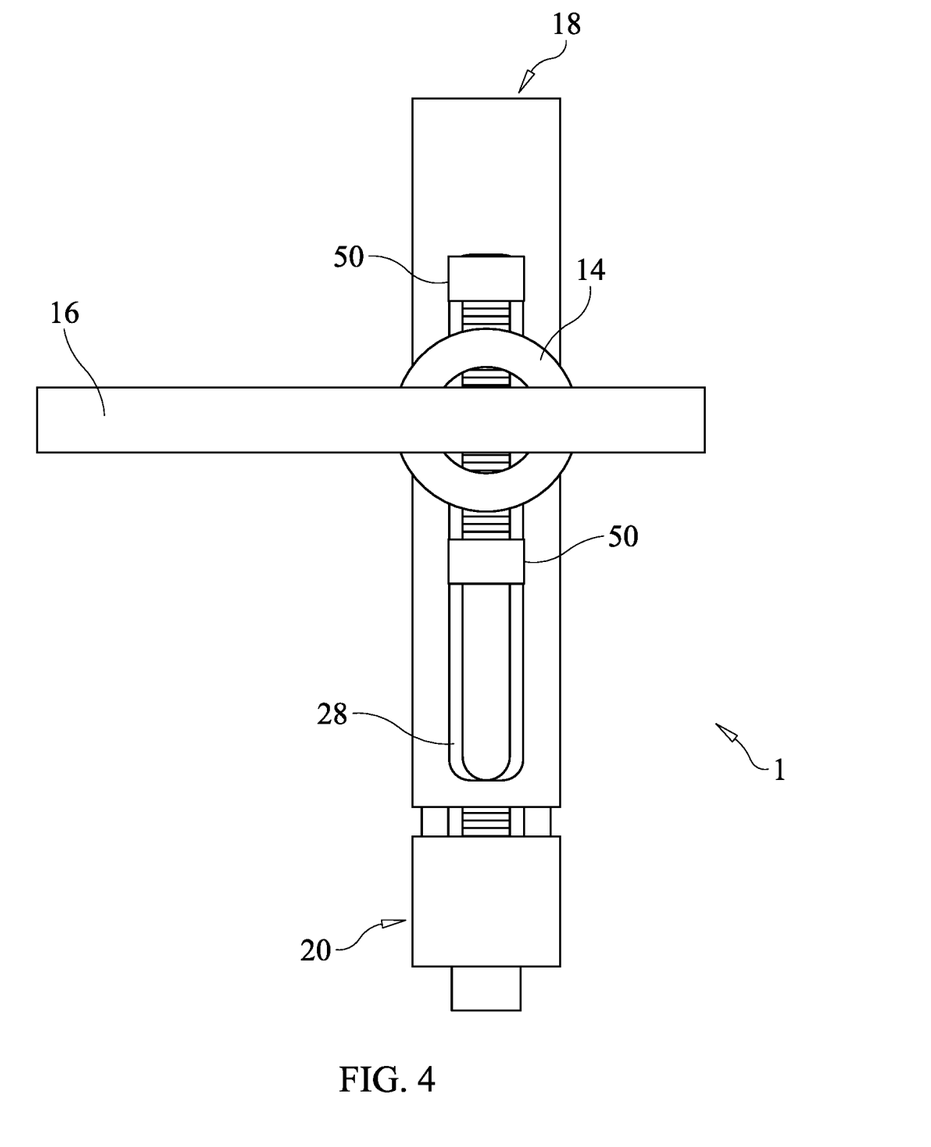
FIG. 4 is a top view of a machining stop in accordance with the present invention.
Figure 5:
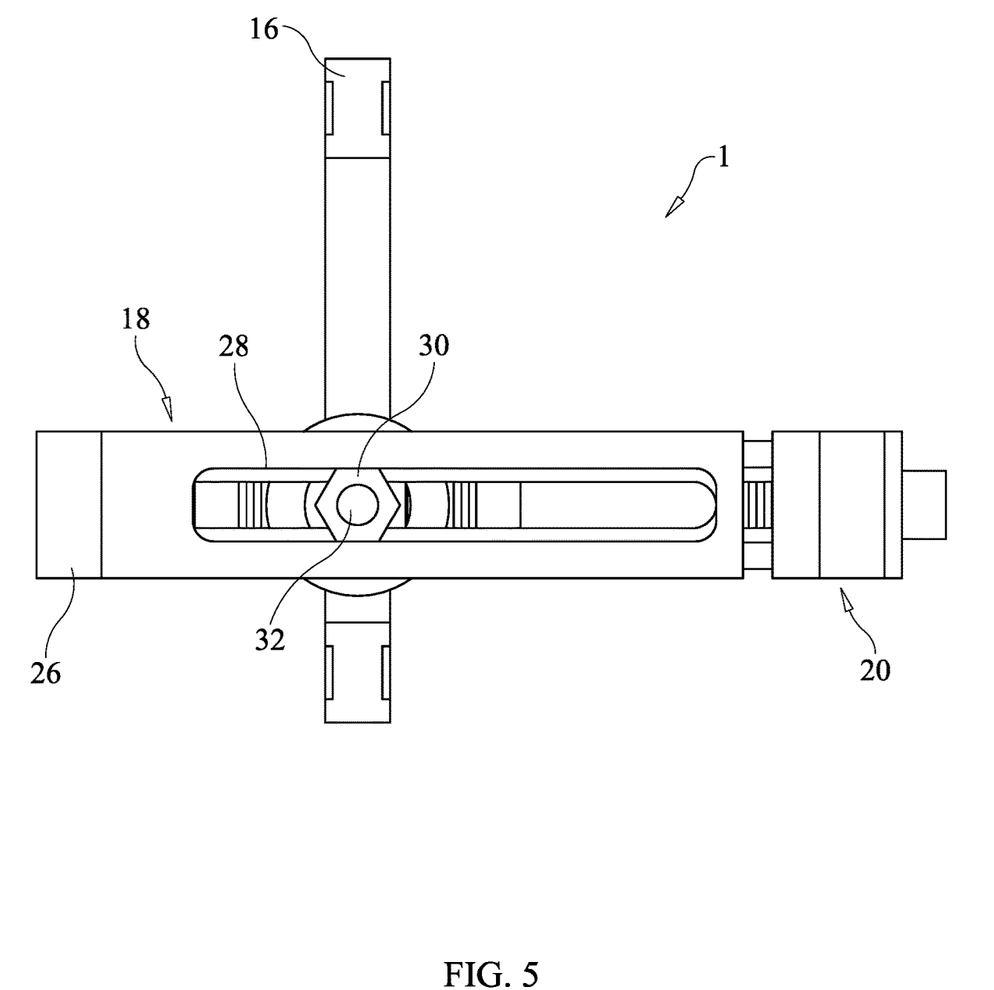
FIG. 5 is a bottom view of a machining stop in accordance with the present invention.

With reference now to the drawings, and particularly to FIG. 1, there is shown a perspective view of a machining stop 1. With reference to FIGS. 2-5, the machining stop 1 preferably includes a retention member 10, a base post 12, an adjustable stop 14 retainer and a tool stop 16. The retention member 10 preferably includes a stationary retention portion 18 and an adjustable retention portion 20. The stationary retention portion 18 includes a stationary base member 22 and a stationary retention member 24. The stationary retention member 24 extends downward from a bottom of the stationary base member 22. A stationary angled leg 26 extends inward from a bottom of the stationary retention member 24. A post counterbore slot 28 is formed through a top of the stationary base member 22 to receive a hex nut 30 or the like and a threaded stud 32 of the base post 12. The adjustable retention portion 20 includes an adjustable base member 34 and an adjustable retention member 36. The adjustable retention member 36 extends downward from a bottom of the adjustable base member 34. An adjustable angled leg 38 extends inward from a bottom of the adjustable retention member 36. An end of the stationary base member 22 is preferably engaged with an end of the adjustable base member 34 with a tightening fastener 40 and at least one dowel 42.

Figure 6:
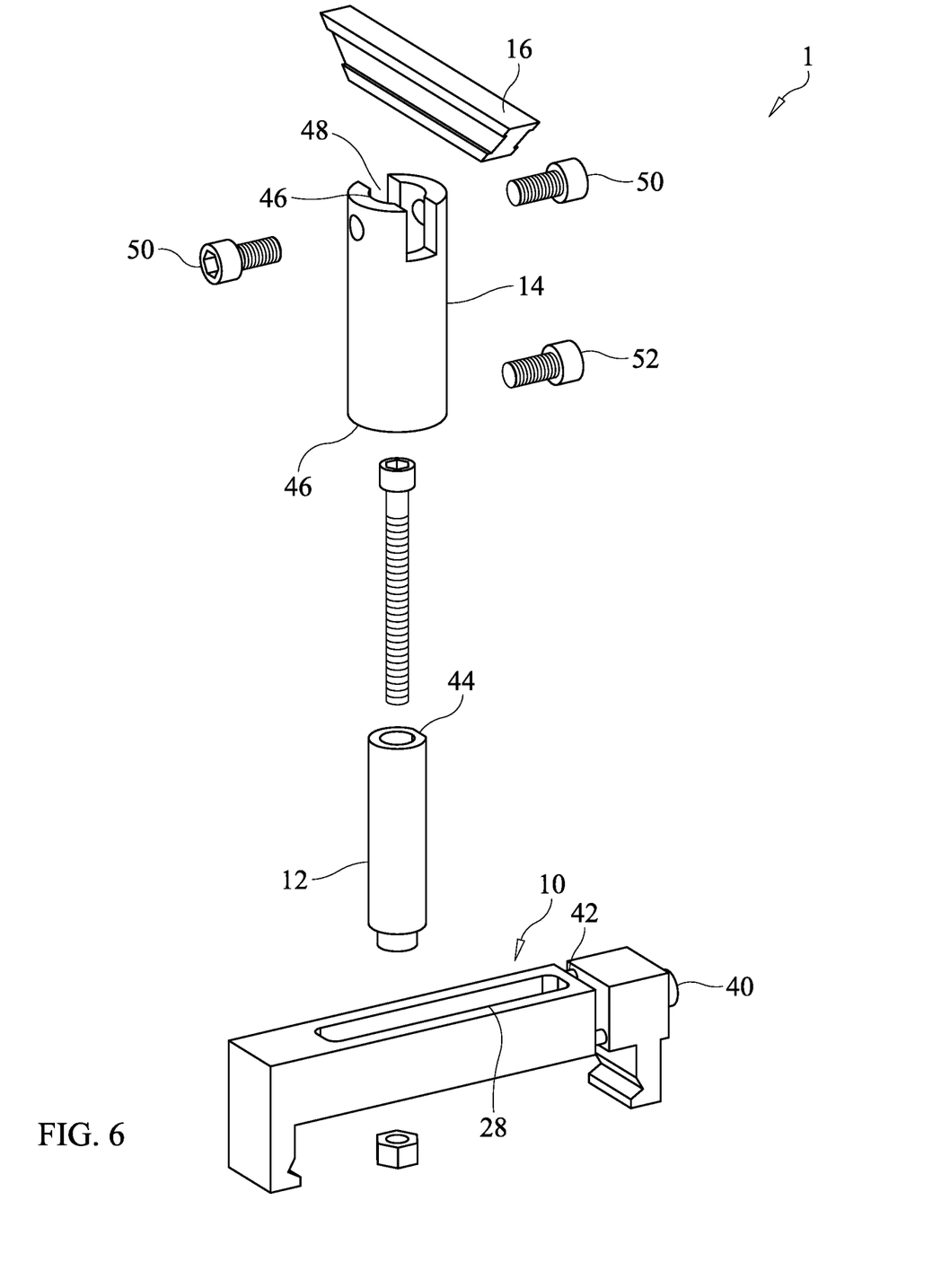
FIG. 6 is an exploded perspective view of a machining stop in accordance with the present invention.
Figure 7:
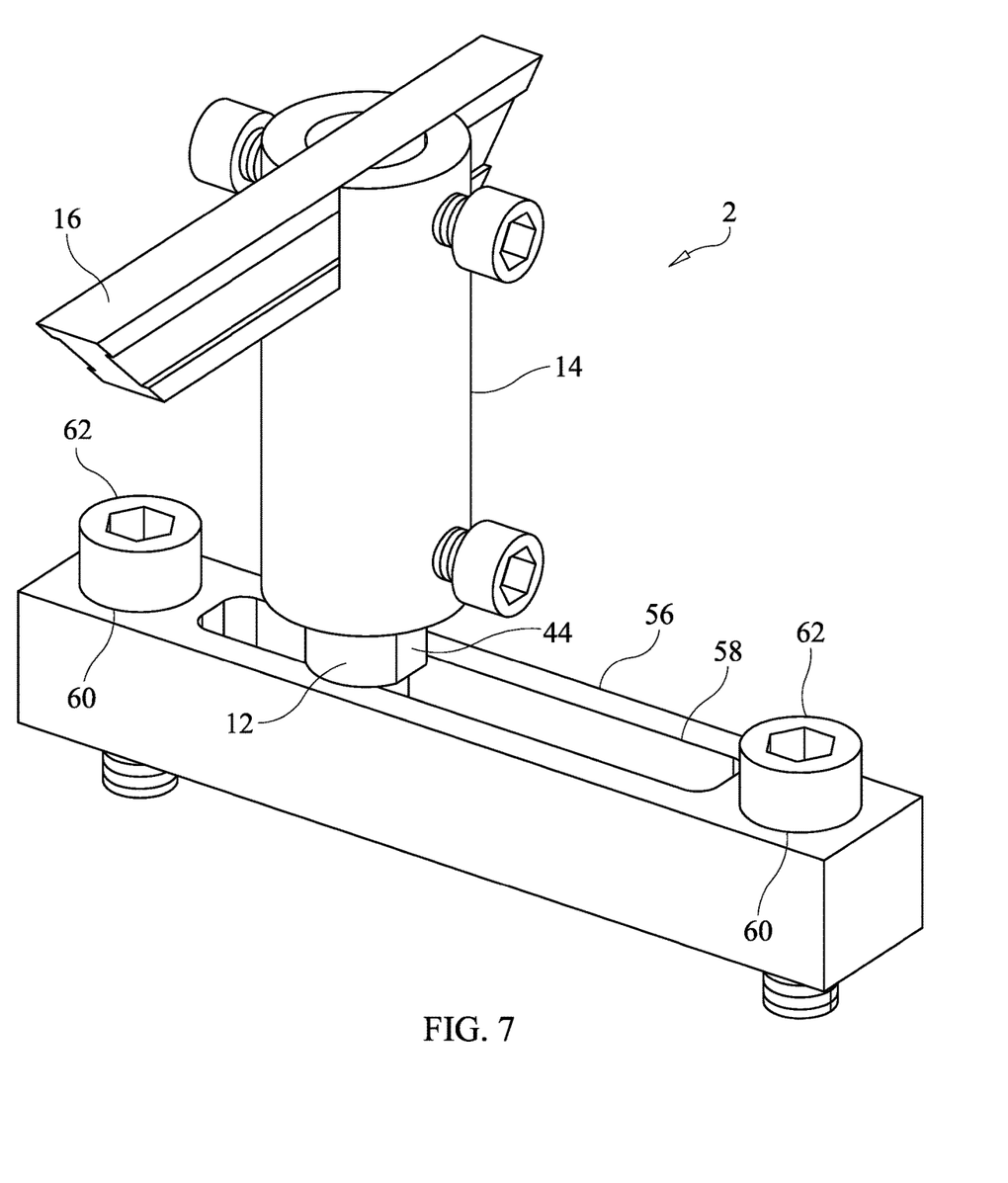
FIG. 7 is a perspective view of a plate machining stop in accordance with the present invention.
Figure 8:
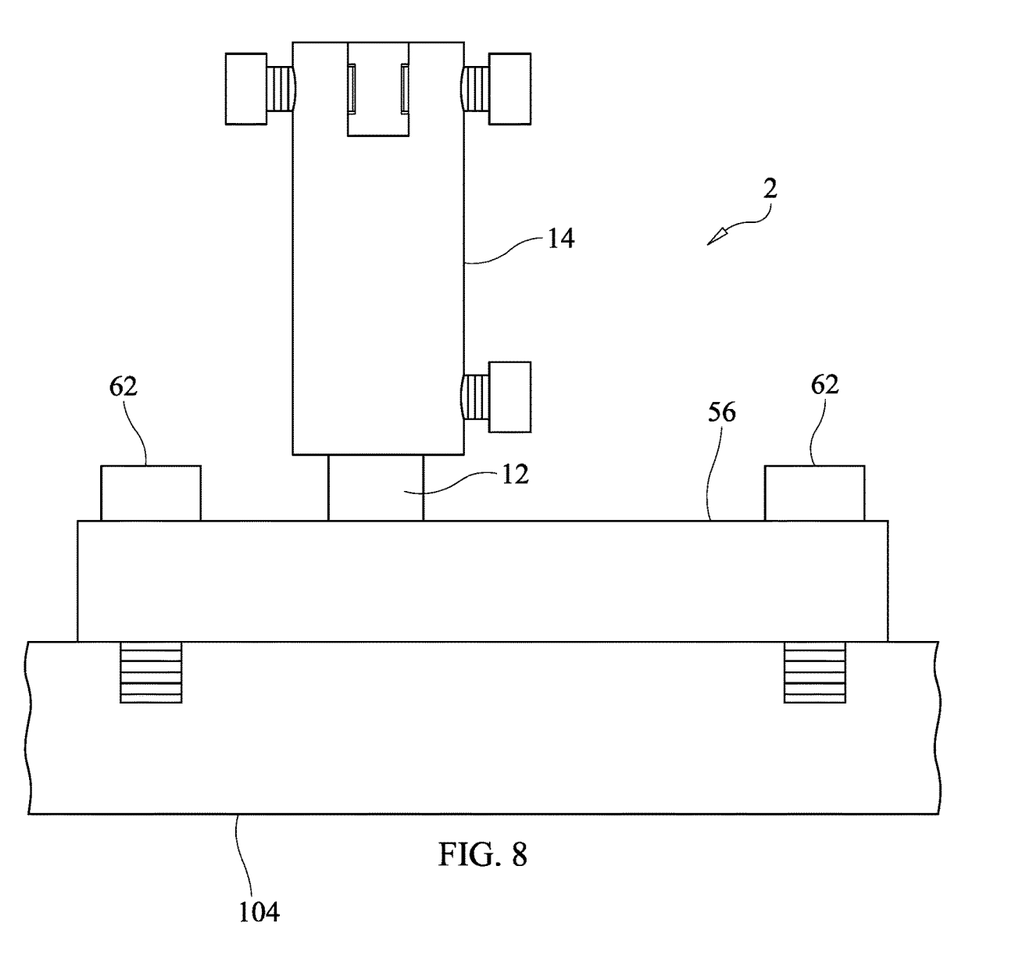
FIG. 8 is an end view of a plate machining stop in accordance with the present invention.
Figure 9:
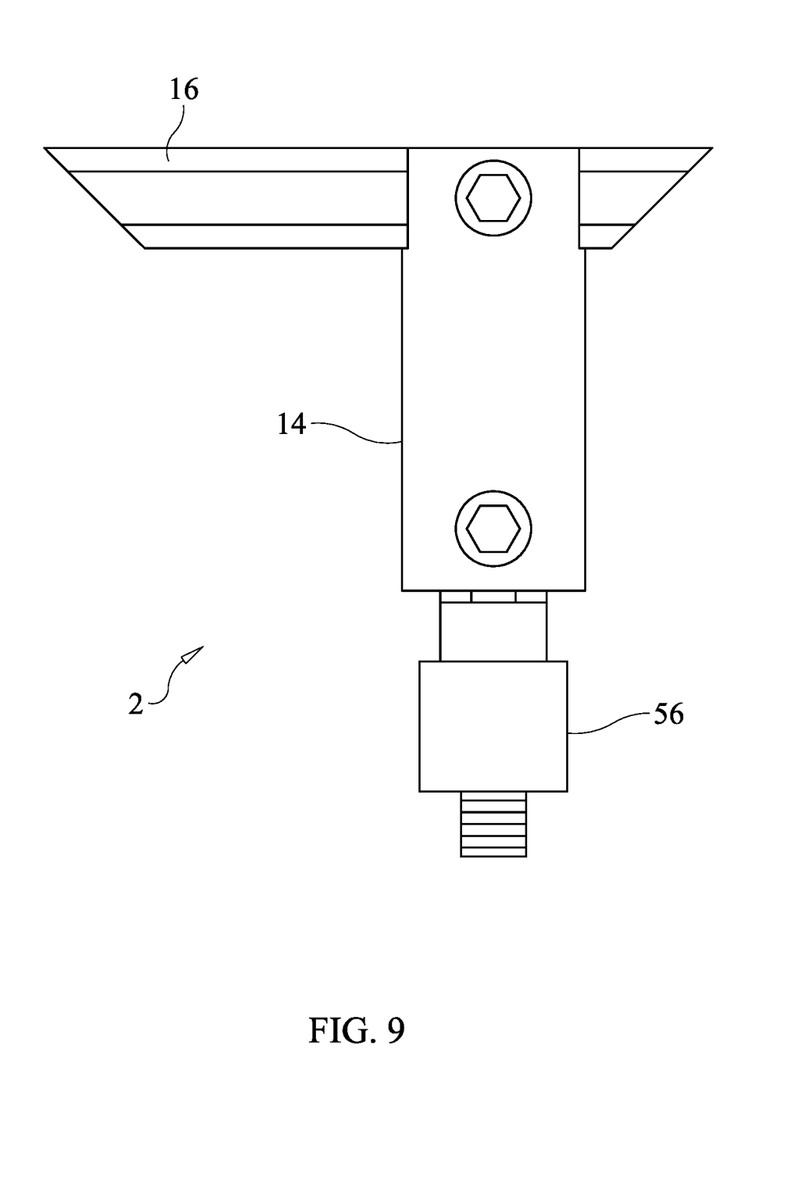
FIG. 9 is a side view of a plate machining stop in accordance with the present invention.
Figure 10:
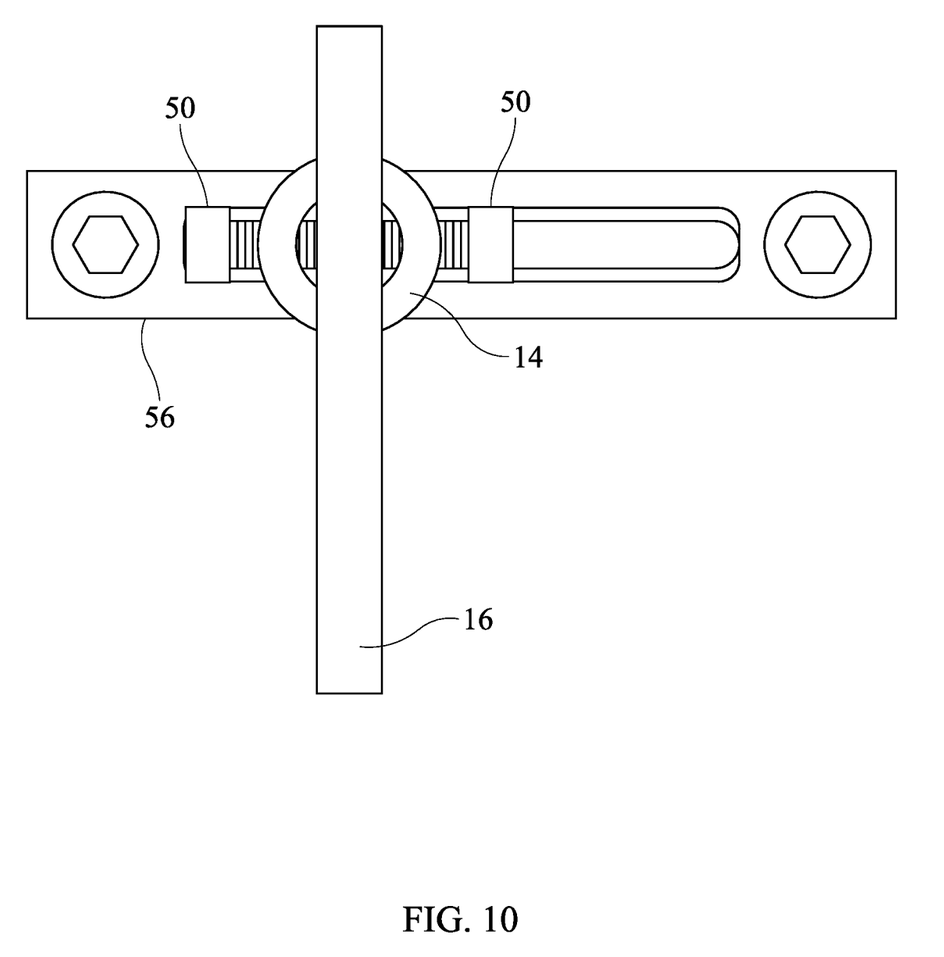
FIG. 10 is a top view of a plate machining stop in accordance with the present invention.
Figure 11:
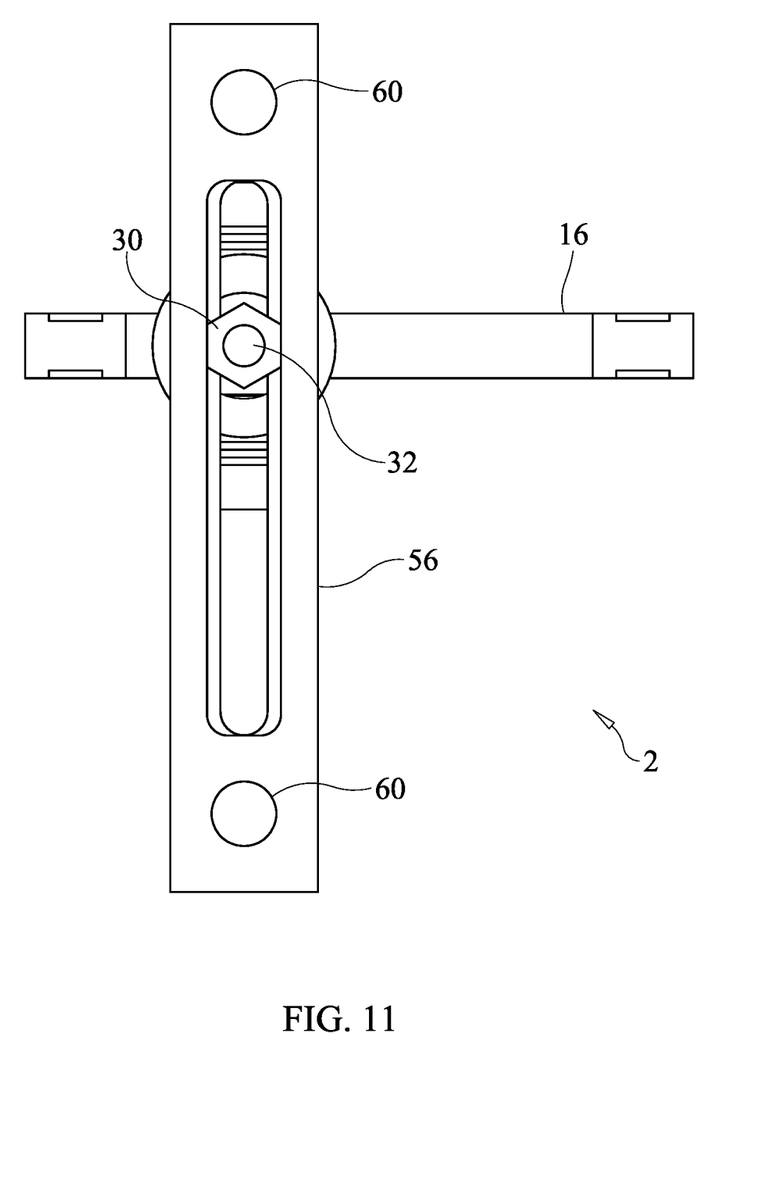
FIG. 11 is a bottom view of a plate machining stop in accordance with the present invention.
Figure 12:
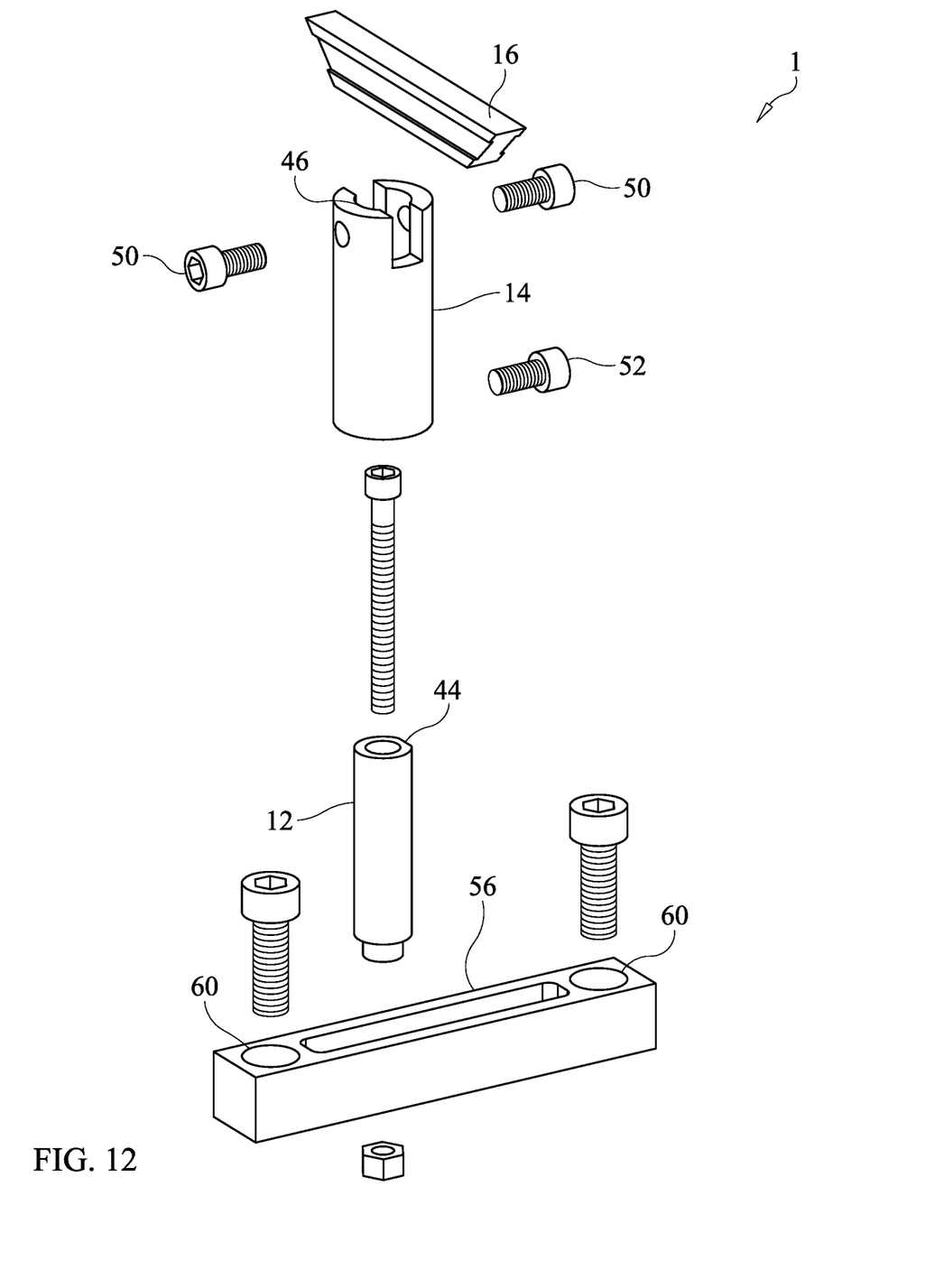
FIG. 12 is an exploded perspective view of a plate machining stop in accordance with the present invention.

With reference to FIG. 6, the base post 12 preferably includes a flat surface 44 formed along length thereof, the threaded stud 32 and the hex nut 30. The threaded stud 32 is threaded into a bottom of the base post 12. The threaded stud 32 is inserted through a top of the counterbore slot 28. The hex nut 30 is inserted into a bottom of the counterbore slot 28 and the base post 12 is rotated to threadably engage the threaded stud 32 with the hex nut 30. The adjustable stop retainer 14 includes a post bore 46, a tool stop notch 48 and at least one stop fastener 50 and a height fastener 52. The post bore 46 is sized to slidably receive an outer perimeter of the base post 12. The tool stop notch 48 is formed in a top of the adjustable stop retainer 14. A height threaded tap is formed through a wall of the adjustable stop retainer 14, adjacent a bottom thereof. A tool stop threaded tap is formed through a wall of the adjustable stop retainer, adjacent a top thereof. The tool stop 16 preferably includes at least one fastener groove 54 formed in at least one side thereof. It is preferable that each end of the tool stop 16 be angled to form a line contact with a cutting tool. However, the ends of the tool stop 16 may have any suitable shape.

The machining stop 1 is preferably used in the following manner. The stationary retention portion 18 and the adjustable retention portion 20 are spread apart, such that the stationary retention member 22 and the adjustable retention member 38 may be inserted into two adjacent keyways 102 of a milling machine platen 100. The tightening fastener 40 is tightened, such that the angled legs 26, 38 of the stationary and adjustable retention members 24, 36 engage a bottom of a portion of the two adjacent keyways 102. The base post 12 is tightened to the stationary retention portion 18 such that the flat surface 44 is perpendicular to an axis of the retention member 10. The base post 12 is inserted into the post bore 46 of the adjustable stop retainer 14. The height of the adjustable stop retainer 14 is set by tightening the height fastener 52 against the flat surface 44. The tool stop 16 is placed in the tool stop notch 48. At least one stop fastener 50 is tightened to secure the tool stop 16 in the tool stop notch 48.

With reference to FIGS. 7-11, a plate machining stop 2 preferably includes a plate retention member 56, the base post 12, the adjustable stop retainer 14 and the tool stop 16. The plate retention member 56 preferably includes a counterbore slot 58 and two fastener counterbores 60 formed on opposing ends. The counterbore slot 58 is formed between the two fastener counterbores 60. The plate machining stop 2 is attached to a top of Stevens type mounting plate 104 by inserting two tightening plate fasteners 62 through the two fastener counterbores 60 and tightening the two tightening fasteners 62. The Stevens type mounting plate 104 is attached to a top of a milling machine platen or the like. The base post 12 is attached to the plate retention member 10 in the same way as in the machining stop 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A machining stop for a machining apparatus, comprising:
   a retention member including a stationary retention portion and an adjustable retention portion, an end of said stationary retention portion is adjustably engaged with an end of said adjustable retention portion, wherein said retention member is engaged with two adjacent keyway slots of the machining apparatus;
   a base post is secured to said stationary retention portion;
   an adjustable stop retainer including a post bore and a tool stop notch, said post bore is sized to slidably receive said base post, said tool stop notch is formed in a top of said adjustable stop retainer;
   a securement device for adjusting a height of said adjustable stop retainer relative to said base post; and
   a tool stop is sized to be received by said stop notch.

2. The machining stop for a machining apparatus of claim 1, wherein:
   at least one fastener is threaded through said adjustable stop retainer to secure said tool stop in said tool stop notch.

3. The machining stop for a machining apparatus of claim 1, wherein:
   a flat surface is formed on a side of said base post.

4. The machining stop for a machining apparatus of claim 1, wherein:
   a counterbore slot is formed in said stationary retention portion for securement of said base post.

5. The machining stop for a machining apparatus of claim 1, further comprising:
   at least one dowel and a fastener for engaging said stationary retention portion with said adjustable retention portion.

6. The machining stop for a machining apparatus of claim 1, wherein:
   said securement device is a fastener threaded through said adjustable stop retainer to secure the height of said adjustable stop retainer relative to said base post.

7. A machining stop for a machining apparatus, comprising:
   a retention member including a stationary retention portion and an adjustable retention portion, an end of said stationary retention portion is adjustably engaged with an end of said adjustable retention portion, said stationary retention portion including a stationary retention member, said adjustable retention portion including an adjustable retention member, wherein said stationary retention member is engaged with a first keyway slot, said adjustable retention member is engaged with a second adjacent keyway slot;

a base post is secured to said stationary retention portion;

an adjustable stop retainer including a post bore and a tool stop notch, said post bore is sized to slidably receive said base post, said tool stop notch is formed in a top of said adjustable stop retainer;

a securement device for adjusting a height of said adjustable stop retainer relative to said base post; and a tool stop is sized to be received by said tool stop notch.

8. The machining stop for a machining apparatus of claim 7, wherein:

said stationary retention portion including a stationary base member and said stationary retention member, said stationary retention member extends downward from a bottom of said stationary base member, a stationary angled leg extends inward from a bottom of said stationary retention member.

9. The machining stop for a machining apparatus of claim 7, wherein:

said adjustable retention portion including an adjustable base member and said adjustable retention member, said adjustable retention member extends downward from a bottom of said adjustable base member, an adjustable angled leg extends inward from a bottom of said adjustable retention member.

10. The machining stop for a machining apparatus of claim 7, wherein:

a post counterbore slot is formed through a top of said stationary base member for attachment of said base post.

11. The machining stop for a machining apparatus of claim 7, wherein:

at least one fastener is threaded through said adjustable stop retainer to secure said tool stop in said tool stop notch.

12. The machining stop for a machining apparatus of claim 7, wherein:

a flat surface is formed on a side of said base post.

13. The machining stop for a machining apparatus of claim 7, further comprising:

at least one dowel and a fastener for engaging said stationary retention portion with said adjustable retention portion.

14. The machining stop for a machining apparatus of claim 7, wherein:

said securement device is a fastener threaded through said adjustable stop retainer to secure the height of said adjustable stop retainer relative to said base post.

15. A plate machining stop for attachment to a machining plate of a machining apparatus, comprising:

a plate retention member including a counterbore slot and two fastener counterbores formed on opposing ends, said counterbore slot is formed between said two fastener counterbores wherein two fasteners are inserted through said two counterbores to tightened to the machining plate to secure said plate retention member to the machining plate;

a base post is secured in said counterbore slot;

an adjustable stop retainer including a post bore and a tool stop notch, said post bore is sized to slidably receive said base post, said tool stop notch is formed in a top of said adjustable stop retainer;

a securement device for adjusting a height of said adjustable stop retainer relative to said base post; and a tool stop is sized to be received by said tool stop notch.

16. The plate machining stop for attachment to a machining plate of a machining apparatus claim 15, wherein:

at least one fastener is threaded through said adjustable stop retainer to secure said tool stop in said tool stop notch.

17. The plate machining stop for attachment to a machining plate of a machining apparatus of claim 15, wherein:

a flat surface is formed on a side of said base post.

18. The plate machining stop for attachment to a machining plate of a machining apparatus of claim 15, further comprising:

at least one dowel and a fastener for engaging said stationary retention portion with said adjustable retention portion.

19. The plate machining stop for attachment to a machining plate of a machining apparatus of claim 15, wherein:

said securement device is a fastener threaded through said adjustable stop retainer to secure the height of said adjustable stop retainer relative to said base post.

* * * * *